United States Patent [19]
Kaufeld et al.

[11] Patent Number: 5,859,967
[45] Date of Patent: Jan. 12, 1999

[54] METHOD AND SYSTEM FOR RELAYING COMMUNICATIONS FROM AUTHORIZED USERS

[75] Inventors: James C. Kaufeld, Freehold; Matthew B. Stone, Hasbrouck Heights, both of N.J.

[73] Assignee: FaxSav Incorporated, Edison, N.J.

[21] Appl. No.: 677,399

[22] Filed: Jul. 9, 1996

[51] Int. Cl.⁶ ...................................................... G06F 1/00
[52] U.S. Cl. .................. 395/186; 395/188.01; 395/200.3
[58] Field of Search ............................. 395/186, 187.01, 395/188.01, 605, 182.01, 200.76, 200.3; 358/402, 407; 340/825.34; 379/93, 94, 95, 96; 380/3, 4, 25, 23

[56] References Cited

U.S. PATENT DOCUMENTS

| | | | |
|---|---|---|---|
| 5,459,584 | 10/1995 | Gordon et al. | 358/402 |
| 5,473,143 | 12/1995 | Vak et al. | 235/380 |
| 5,479,411 | 12/1995 | Klein | 358/402 |
| 5,483,352 | 1/1996 | Fukuyama et al. | 358/402 |
| 5,508,817 | 4/1996 | Kunigami | 358/402 |
| 5,509,000 | 4/1996 | Oberlander | 379/93 |
| 5,511,114 | 4/1996 | Stimson et al. | 340/825.34 |
| 5,530,740 | 6/1996 | Irrebarren et al. | 379/94 |
| 5,552,897 | 9/1996 | Mandelbaum et al. | 358/400 |
| 5,559,721 | 9/1996 | Ishii | 358/402 |
| 5,564,038 | 10/1996 | Grantz et al. | 395/491 |
| 5,577,108 | 11/1996 | Mankovitz | 397/97 |
| 5,579,479 | 11/1996 | Plum | 380/4 |
| 5,604,803 | 2/1997 | Aziz | 380/25 |

OTHER PUBLICATIONS

FAQ: How can I send a fax from the Internet?, Feb. 23, 1996, pp. 1–11.

*Primary Examiner*—Joseph Palys
*Attorney, Agent, or Firm*—Oblon, Spivak, McClelland, Maier & Neustadt, P.C.

[57] ABSTRACT

A method and system for converting an email message to a facsimile only for authorized users of an account which has been previously created. After a user registers and provides an email address and appropriate billing information, stamps or authorization codes are transmitted to the user via email. When the user desires to have an email message transmitted via facsimile to another party, the user transmits, from a registered account, an email message which includes the fax number to which the facsimile is to be transmitted and contains a stamp. A computer operated by a service provider receives the email message, checks to see that the email message originated from a valid account, and contains a valid stamp. The stamp is then removed from the email, the email is converted to an image which is transmitted via facsimile to the appropriate telephone number, and the account which was previously registered is billed.

30 Claims, 12 Drawing Sheets

```
1    From:       Jim@network.com
2    To:         1-212-123-4567@faxsav.com
3    Subject:    Test of Email to Fax Delivery System
4    Date sent:  Tue, 21 May 1996 10:46:15
5
6    _____
7
8    Dear Jim,
9
10   This is a test of the FaxSav email to fax
11   delivery system.  Was the fax received
12   successfully?
13
14   -- Frank
15
16   6iSenZ
```

Fig. 4

```
1   Email to Fax Delivery
2
3   Date:       May 21, 10:51:38
4   To:         1-212-123-4567
5   From:       Jim@network.com
6   Subject:    Test of Email to Fax Delivery System
7   Total Pages: 1
8
9   _____
10
11  Dear Jim,
12
13  This is a test of the FaxSav email to fax
14  delivery system.  Was the fax received
15  successfully?
16
17  -- Frank
```

Fig. 6

```
1    To:         Jim@network.com
2    Date sent:  21-May-96 10:52:22
3    From:       support@faxsav.com
4    Subject:    FaxSav delivery notice: Test of...
5
6    DELIVERY NOTICE
7
8    Your email received at May 21, 10:51:34 from
9    email address Jim@network.com with a subject of
10   <Test of Email to Fax Delivery System> was
11   delivered to 1-212-123-4567.  The date and time
12   of delivery was May 21, 10:52:20
13
14   The number of pages delivered was 1.
15
16   Delivery was made on attempt # 1.
17
18   Called fax machine identifier: 212-123-4567
```

Fig. 7

METHOD AND SYSTEM FOR RELAYING COMMUNICATIONS FROM AUTHORIZED USERS

BACKGROUND OF THE INVENTION

1. Field of the Invention

This invention relates to a method and system for relaying communications from a first party to a second party through a third party. The invention is more particularly related to a method of relaying communications by the third party only for authorized users having valid accounts. The invention is more particularly related to converting, by the third party, a received electronic mail message to a facsimile which Is transmitted to a facsimile machine when the electronic mail message originates from an authorized user and contains a valid authorization code.

2. Discussion of the Background:

Internet electronic mail (email) provides an easy, inexpensive, and fast manner of transmitting communications. However, there are many people throughout the United States and the world who do not have access to an internet electronic mail account or who are not able to check their internet account while traveling. Many of these people without internet electronic mail accounts do have access to a facsimile machine which is capable of receiving facsimile communications.

In order to utilize the receiving party's facsimile machine yet still take advantage of the essentially free internet email, there currently exists both commercial services and free services to which internet email can be sent which will convert the email to a fax which is forwarded to the receiving party's fax machine. There is a file available through the internet which explains how to fax from the internet and is entitled "FAQ: How can I send a fax from the Internet?". This FAQ (answers to Frequently Asked Questions) is currently in version 1.5, dated Feb. 23, 1996, is available on the World Wide Web at http://www.northcoast.com/savetz/fax-faq.html and is authored by Kevin M. Savetz.

While conventional internet to fax services allow a facsimile to be transmitted at a much lower cost than a conventional long distance facsimile communication, the inventor has noticed that a problem exists in that there is no simple yet secure manner of billing users to forward a received electronic mail message by facsimile.

SUMMARY OF THE INVENTION

Accordingly, it is an object of the invention to provide a novel method and system for a third party to relay communications between two parties, only if an authorized account has been set up with the third party. It is a further object of the invention to provide a method and system for relaying communications in which the transmitting party uses both an account name and an authorization code.

It is yet another object of the invention to make the authorization code valid for a limited number of communications.

It is still another object of this invention to use the method and system for transmitting communications in a system which receives an electronic mail message including an authorization code or stamp, and transmitting the received email message as a facsimile when the electronic mail message originates from a valid user.

These and other objects are accomplished by a method and system for receiving electronic mail messages and converting the electronic mail messages to facsimile transmissions. The email message is transmitted by a first party using a computer and is intended to be ultimately transmitted to a second party located at a facsimile machine having a predetermined phone number.

The first party transmits the electronic mail message to the third party as an email message over the internet. The third party receives the email message and determines if the electronic mail message originated from an authorized email address and if the email contains what is referred to as a stamp. Throughout this writing, the term stamp is defined to be an authorization code which preferably is used only by a single user for a limited number of times. However, it is also possible that the stamp may be used an infinite number of times, if desired, and it is also possible for more than one account to be issued the same stamp. If the email message is determined to have originated from an authorized user and also contains a valid stamp, a counter is decreased by one. The counter is then checked to see if it is equal to zero. If it is, this stamp is cancelled, meaning that it is no longer a valid authorization code and cannot be used for this account again.

After the email message is determined to have originated from a valid user and contains a proper authorization code or stamp, the stamp is deleted from the email message. The email is then converted to a facsimile format and transmitted to the intended party without showing the stamp. After the intended party successfully receives the facsimile, an electronic mail message is transmitted back to the sender indicating the facsimile was successfully transmitted and the sender's account is billed for the facsimile transmission.

In the preferred embodiment of the invention, the authorization code or stamp can only be used a limited number of times and therefore, the user must be periodically transmitted new stamps. This can be performed automatically by monitoring the number of valid stamps which a user has and automatically transmitting new stamps when the valid number of stamps which the user possesses drops below a predetermined level. Alternatively, the user may request the transmission of stamps by telephone, facsimile, mail, through the World Wide Web of the internet, or through internet email.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 illustrates an email message transmitted from the local computer over the internet to the commercial service which converts the email to a facsimile;

FIG. 6 illustrates an exemplary format of a facsimile which has been generated from the email message of FIG. 4;

FIG. 7 illustrates a delivery notice which has been sent by email to the original email sender confirming delivery by facsimile of the original message;

DESCRIPTION OF THE PREFERRED EMBODIMENTS

Figure 1:
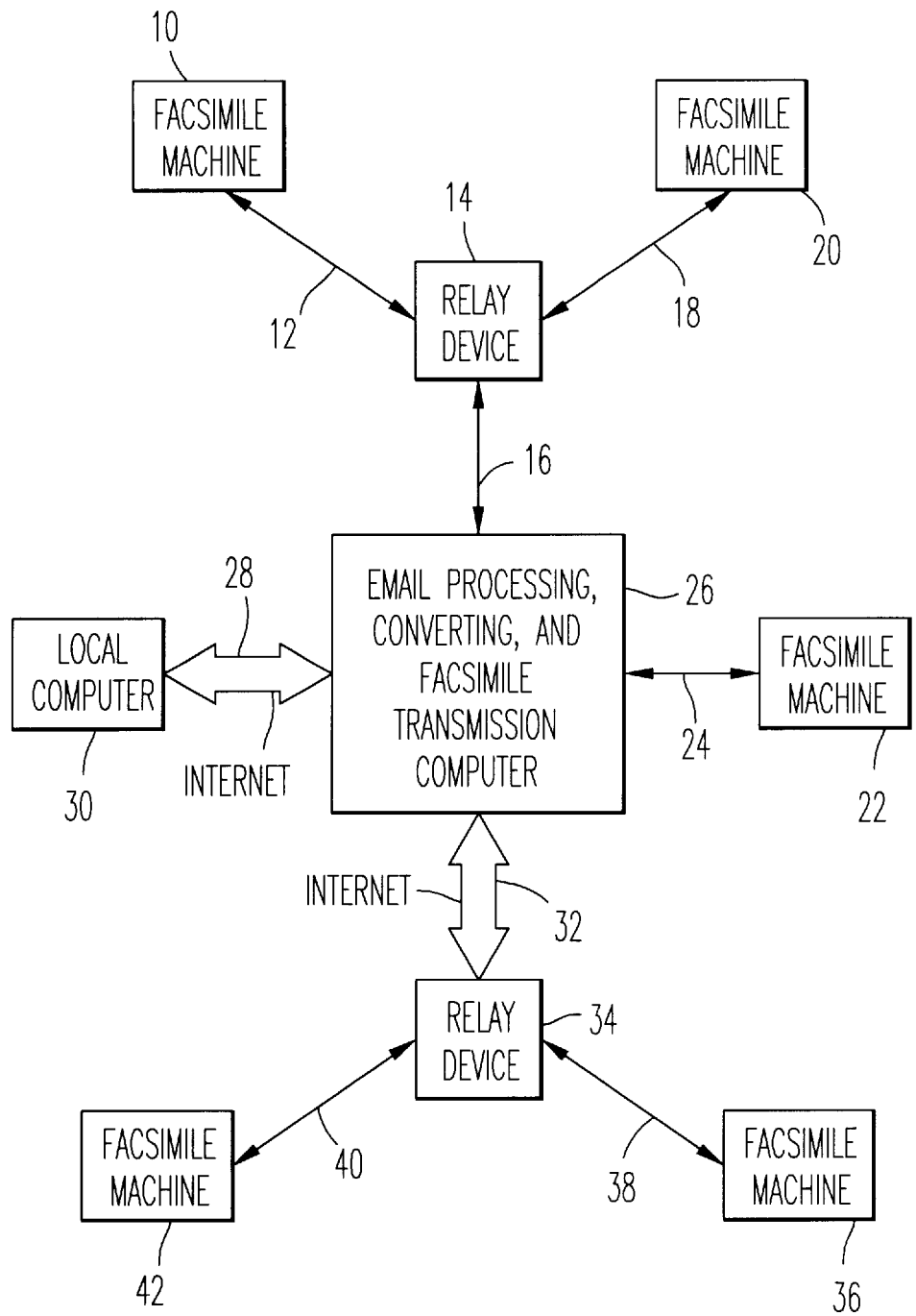
FIG. 1 illustrates a block diagram of the system utilized by the present invention.

Referring now to the drawings, wherein like reference numerals designate identical or corresponding parts throughout the several views, and more particularly to FIG. 1 thereof, there is illustrated a block diagram of a system implementing the electronic mail (email) to facsimile conversion and delivery process. A local computer 30 is capable of transmitting email messages over the internet 28 to an email processing, converting, and facsimile transmission computer 26. The local computer 30 and transmission computer 26 are implemented as any general or special purpose computer such as an IBM compatible computer having an 80486 or Pentium microprocessor from Intel, any type of Macintosh computer or any other type of computer or processing device. The local computer 30 executes any type of communication or email program such as a commercially available email program, for example Eudora Mail or Pegasus Mail. The local computer 30 may be connected to the internet 28 in any desired manner such as through a modem to an internet service provider using any type of telephone or ISDN (integrated services digital network) communication line or through a direct connection to the internet 28.

According to the preferred embodiment of the invention, an email message is transmitted from the local computer 30 over the internet 28 to the email processing, converting, and facsimile transmission computer 26. The transmission computer 26 receives the email message, checks to see if the email message is from an authorized account (e.g., originates from a valid email address) and contains a proper authorization code, converts the electronic mail to a facsimile, and transmits the facsimile to a facsimile machine, such as facsimile machine 22 over a telephone line 24. The transmission computer 26 is purchased and maintained by the commercial provider of the email to facsimile delivery service. Details of the process performed within the transmission computer 26 are explained below with respect to the flowcharts illustrated in the drawings.

As an alternative to the transmission computer 26 transmitting the facsimile directly to a facsimile machine over a publicly available telephone line 24, the transmission may occur over a special or dedicated communication line 16 which is different from and preferably less expensive to use than the ordinary telephone line 24. The communication line 16 may be a leased line, a wireless communication channel, a satellite communication channel, or any other desired and suitable communication line or medium which is preferably transmitted out of the local calling area of the transmission computer 26. The relay device 14 is utilized to link the facsimile transmission from the dedicated communication line 16 to local communication lines 12 and 18 which may be part of the telephone network to which facsimile machines 10 and 20 are connected. The relay device 14 may also be implemented as a conventional connection of a discount long distance service which uses its own long distance communication line 16 to connect to the local telephone lines 12 and 18.

As a further alternative, a different relay device 34 connected between facsimile machines 42 and 36, and the transmission computer 26 may be utilized. In this alternative arrangement, the communication line 32 connecting the transmission computer 26 and the relay device 34 is the internet. The transmission computer 26 converts the email message to a G3 facsimile format message which is transmitted over the internet 32 to the relay device 34 which is a computer. The relay device 34 then forwards the G3 facsimile format message over communication lines 38 or 40 to facsimile machines 36 or 42. The transmission computer 26 performs the functions described in FIGS. 8A and 8B and the relay device 34 performs the functions described in FIG. 8C. As another alternative, the transmission computer 26 will forward, as an internet email message, the email message received from the local computer 30 to the relay device 34 which implements the processing and converting functions described in the flowchart of FIG. 8A–8C. These alternatives provide an inexpensive manner of transmitting the communication over long distances as long distance telephone communication lines may be reduced or eliminated. Communication lines 40 and 38 are preferably implemented using local telephone lines, although any other desirable communication line may be utilized.

Each of the facsimile machines illustrated in FIG. 1 are implemented using standard commercially available stand-alone dedicated facsimile machines, multi-purpose machines which include facsimile and copying functions, or computers which have circuitry for processing facsimile signals.

Figure 2:
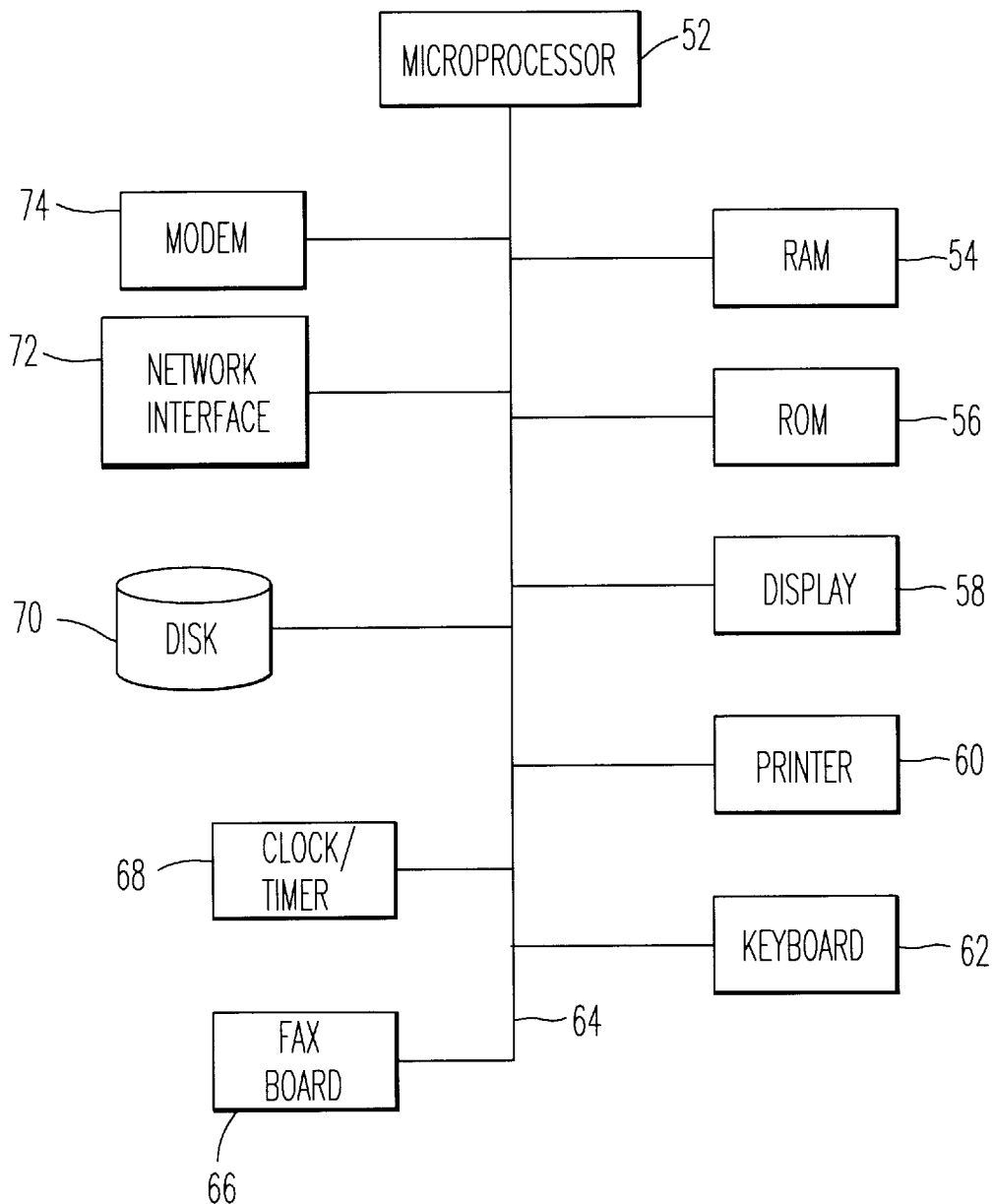
FIG. 2 illustrates a block diagram of the components of a computer utilized with the invention.

FIG. 2 illustrates a block diagram of the components used to implement any of the devices illustrated in FIG. 1 including the local computer 30, the transmission computer 26, the relay device 34, or one of the facsimile machines. The device illustrated in FIG. 2 contains a microprocessor 52 such as a commercially available microprocessor from Intel or Motorola, a RAM (Random Access Memory) 54 utilized as a working memory, a ROM (Read Only Memory) 56 used to store programs executed by the device, a display 58 such as a conventional CRT, LCD, or any other suitable display, a printer 60 such as a laser, ink jet, or dot matrix printer, and a keyboard 62. A system bus 64 connects each of the components illustrated in FIG. 2. There is a fax board 66 which is utilized to transmit and receive facsimile communications, a clock/timer 68 for keeping track of the date and time, a disk 70 such as a hard disk or a floppy disk for storing program information, received email, and/or facsimile images which are to be transmitted. A network interface 72 is used to connect to a network such as the internet, a wide area network, or a local area network. The wide area network or local area network may serve as a connection to the internet. The device in FIG. 2 also includes a modem 74 for communicating, via telephone, cable or other suitable communication lines to another computer or to a network. If the device illustrated in FIG. 2 is utilized to relay messages, additional modems or network interfaces may be utilized. Depending on the specific application, some components illustrated in FIG. 2 may be omitted such as the printer, display, or keyboard, for example.

Figure 3:
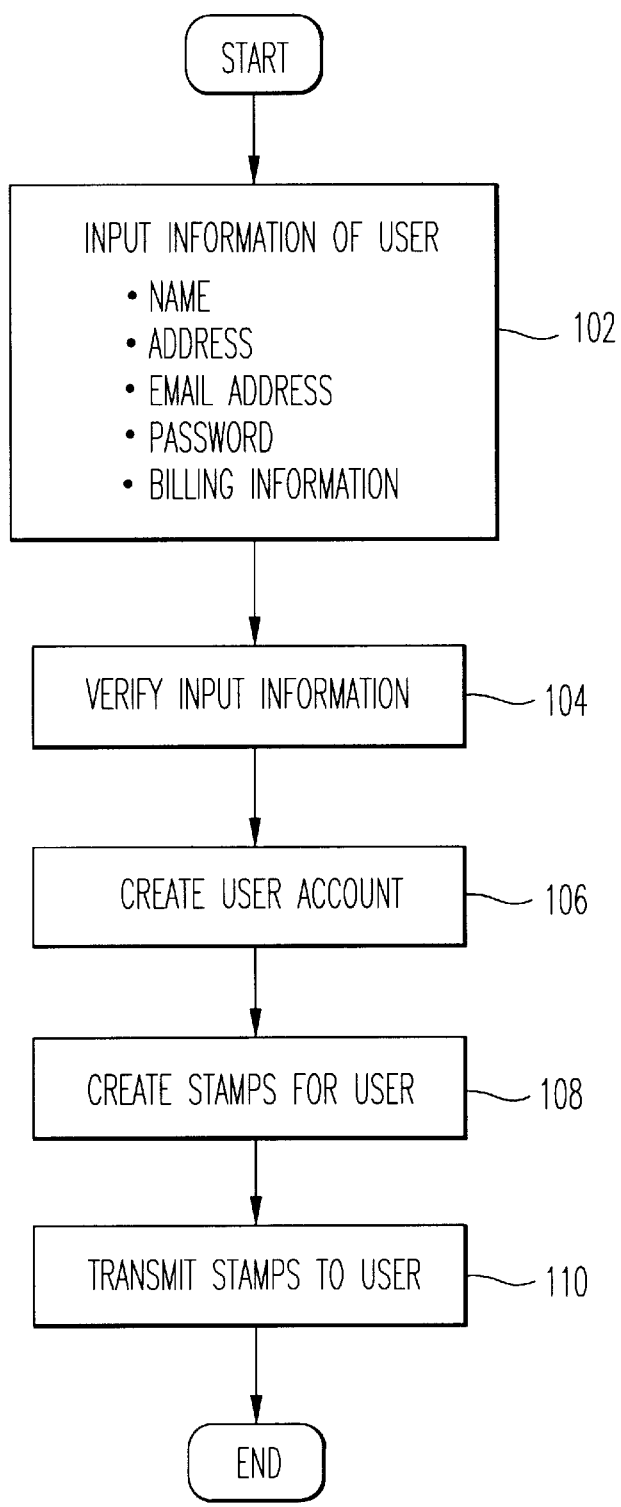
FIG. 3 is a flowchart of a process used to register a user.

FIG. 3 illustrates a process of registering a user in order for the user to become an authorized customer of the email to facsimile delivery system of the present invention. After starting, the user must first enter information which defines the user such as the user's name, address, email address, password, and billing information. The user's address is a conventional street address including city or P.O. Box address to which United States mail is sent. According to the preferred embodiment of the invention, the email address is the address from which all email communications which are to be converted to facsimiles must originate. If the user will utilize more than one email address from which email will be sent or the user desires the fax delivery notice or stamps (authorization codes) to be sent to a different email address, these alternate email addresses may also be entered. The user also enters a desired password. Future requests for changes in services or the ordering of additional stamps must include this password. The user must also enter billing information such as credit card information or checking account information or any other suitable billing information to which provided services will be charged. If the user desires to receive stamps or other communications via facsimile, the user will also register a facsimile number.

After all of the information has been input in step 102, step 104 verifies that the input information is correct by displaying to the user the information which has been input. Step 104 will also, if desired, check to see that the billing information such as a credit card which has been entered is an actual account which can be billed. If there are any problems with the input information, the user is asked to correct the problems. After the information has been verified, step 106 creates an account for the user. Step 106 registers the user in a database so that the user's information can be checked in the future in order to determine if the user is authorized or to bill the user.

The present invention converts email messages to facsimile format and transmits the facsimiles and charges the user for this service. In order to assure that an authorized user is charged for the email to fax delivery, not only must the email originate from an account which matches an account which has been input in step 102, but the email message must contain a valid stamp. A stamp which is discussed herein is similar to a stamp issued by the United States post office in that the stamp is required in order for the system to process the email and convert the email to a facsimile. However, the stamp is different from conventional post office stamps in that by itself it does not have any value, and is used as an authorization code. In the preferred embodiment of the invention, stamps are six characters which are randomly generated and preferably unique to a particular user. The characters permitted within the stamp are numbers, letters, punctuation marks, or any other character which can be entered using a computer keyboard. Preferably, the characters are easily typeable by any computer throughout the world. The present inventor has noticed a problem that not all alpha-numeric or punctuation symbols commonly used in the United States are easily available on foreign computers or are sometimes mixed up with different characters on foreign computers. For example, the letter "Ñ" on a computer used in the United States is often "N" in Spanish countries. Therefore, there might be a problem in using the letter "Ñ" in a stamp as a user in a Spanish speaking country might not be able to easily create this character. Therefore, part of the present invention includes using only alpha-numeric characters and other symbols on a computer keyboard which are easily created using computers in a majority of the countries throughout the world.

As previously stated, the stamps used by the invention can be randomly generated to be unique to a particular user and contain any number of characters, as desired. In the preferred embodiment of the invention, six characters are used in the stamp. The preferred manner of generating a stamp is to generate a random number. Thirty-six bits of this random number are utilized and divided into six sections, each being six bits long. These six bits are then mapped to the alpha-numeric characters and punctuation marks in order to generate the six character stamp. It is preferable to have each customer or user of the system to have his or her own unique stamps. However, by randomly creating the stamps as described above to be six characters, the chances of two users being issued the same stamp are quite low and the chances of an unauthorized user guessing the stamp of a user are quite low.

After step 108 creates the stamp for the user as described above, step 110 transmits the stamps to the user. The stamps are preferably transmitted to the user via email, although regular mail or a facsimile communication may also be used to transmit the stamps. While it is true that unencrypted email is not completely secure and therefore, it may be possible for an unauthorized person to obtain stamps intended for an authorized user, the chances of this occurrence are quite low and some effort will be needed to obtain the stamps in an unauthorized manner. Based on the fact that the stamps have no intrinsic value by themselves and that the email communications must originate from an authorized user, the stamps provide a good level of security and is sufficient for the type of security needed in order to properly bill an authorized user for a delivery of a communication. After the stamps are transmitted to the user in step 110, the process of FIG. 3 ends.

FIG. 4 illustrates an exemplary email message utilized with the invention. The email message in FIG. 4 includes lines numbers 1-16 which are not actually part of the email message but are included to serve as references to the lines of the email message. Line 1 indicates that the message is transmitted from Jim@network.com. From whom the email originates is automatically generated by the email program used to create the email. Line 2 of FIG. 4 indicates that the address to which the email is to be sent is 1-212-123-4567@faxsav.com. Faxsav.com is the destination of the email and 1-212-123-4567 is the phone number to which the facsimile is to be transmitted. As an alternative to including the phone number within the email address, the phone number can be included in an alternative section of the email message, as desired, such as within the text of the email or at the subject line of the email. Lines 8–14 include the text of the email message which is to be transmitted by facsimile and line 16 contains the stamp or authorization code. This stamp will be stripped out of the text message so it is not delivered to the recipient of the facsimile.

Figure 5:
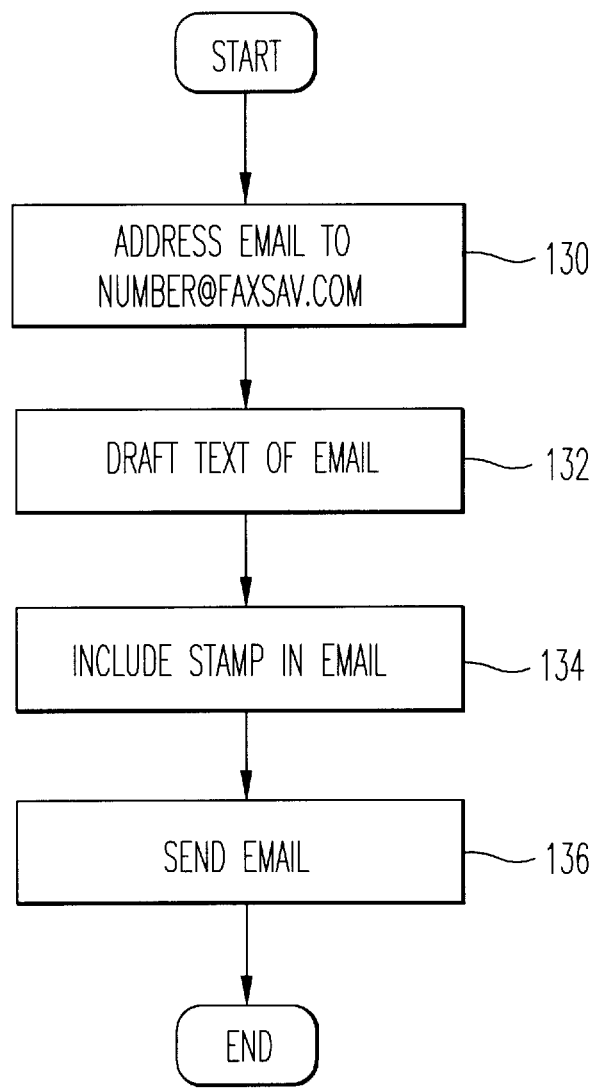
FIG. 5 is a flowchart of creating an email message utilized by the invention.

FIG. 5 is a flowchart of a process used to create the email message illustrated in FIG. 4. After starting, the user first addresses the email to the number of the facsimile machine to which the final facsimile message is to be delivered at faxsav.com, or to any suitable domain. In step 132, the user drafts the text of the email and in step 134, the user includes the stamp or authorization code within the email. Additionally, the user can also include a subject line within the email. In step 136, the user transmits the email message, ordinarily by clicking on a "send" button on a graphical user interface of the email program being used. The process of FIG. 5 then ends.

FIG. 4 illustrates that the stamp is included in a separate line within the text of the email. However, the exact position of the stamp is not important as long as it is included somewhere within the message being sent. For example, RFC (request for comments) 1521 dated September, 1993, which defines internet email standards defines "Multipurpose Internet Mail Extensions" (MIME) Part One: Mechanisms for Specifying and Describing the Format of Internet Message Bodies. This RFC specifically permits a private content type in which the header of an internet email message can contain a private type which starts with "X-". This feature may be useful with the present invention as the stamp can be included within the header and not the body of the text and could appear as follows "X-STAMP: 6iSenZ", or any other value for the stamp. Further alternative manners of including the stamp within the email or even outside of the email, if desired, can also be implemented.

After the email message is transmitted, it will be converted to a facsimile format and transmitted by facsimile to the appropriate fax machine. An exemplary facsimile which results from the email illustrated in FIG. 4 is illustrated in FIG. 6. The line numbers in this facsimile do not exist on the facsimile but have been included in order to simplify references to the specific lines of the facsimile message.

Line 1 of FIG. 6 indicates that the received facsimile is an email to fax delivery, meaning it originated from an email and is automatically generated during the conversion process. The "To" line contains the phone number of the receiving facsimile device, line 5 indicates that the message is from the address of the person sending the email, line 6 includes the subject which was copied from the email, and line 7 indicates the number of pages of the facsimile. Lines 11–17 include the text contained within the email and correspond to lines 8–14 of FIG. 4. The stamp included at line 16 of FIG. 4 was deleted from the message and is not included in the facsimile transmission illustrated in FIG. 6.

FIG. 7 illustrates an email message which was sent from the transmission computer 26 illustrated in FIG. 1 back to the local computer 30 over the internet confirming that the facsimile was successfully transmitted. As an alternative to the successful delivery notice illustrated in FIG. 7, if the facsimile was not successfully transmitted, a message can be sent indicating that transmission of the facsimile failed and if desired, the reason why the facsimile transmission failed, to the extent known.

Figure 8A:
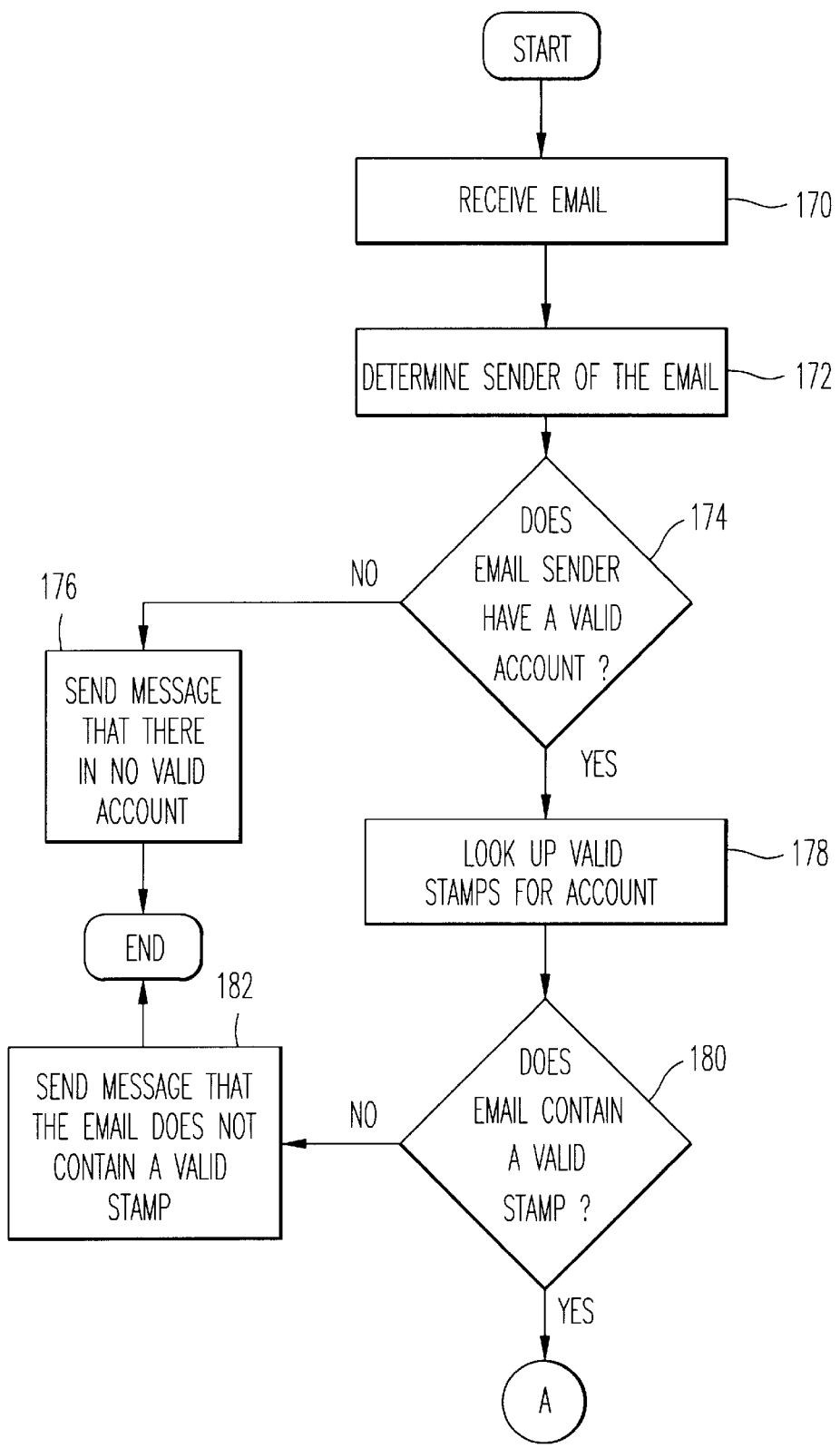
FIGS. 8A–8C are a flowchart of determining if the original email is from an authorized user and for converting the email to a facsimile format.
Figure 8B:
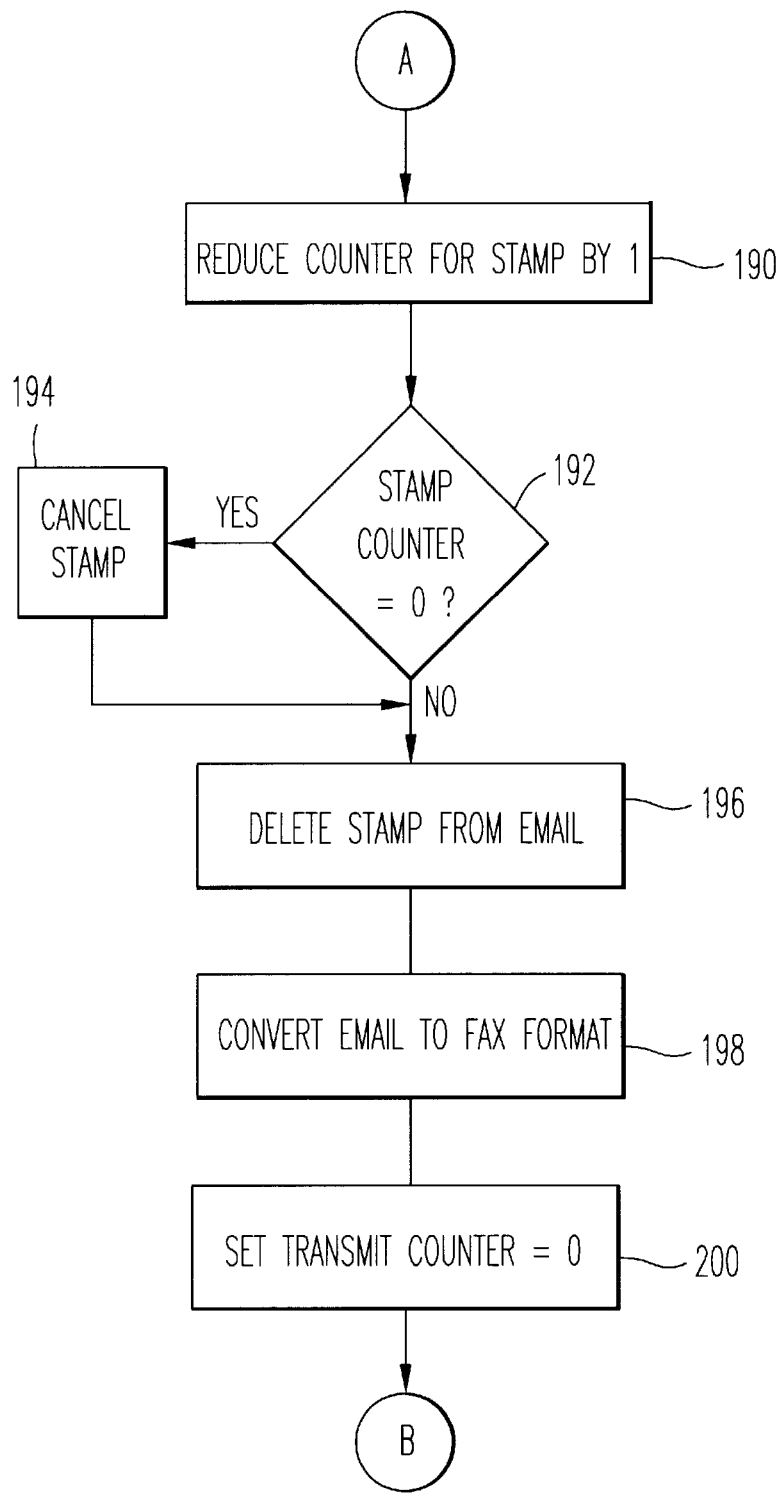
Figure 8C:
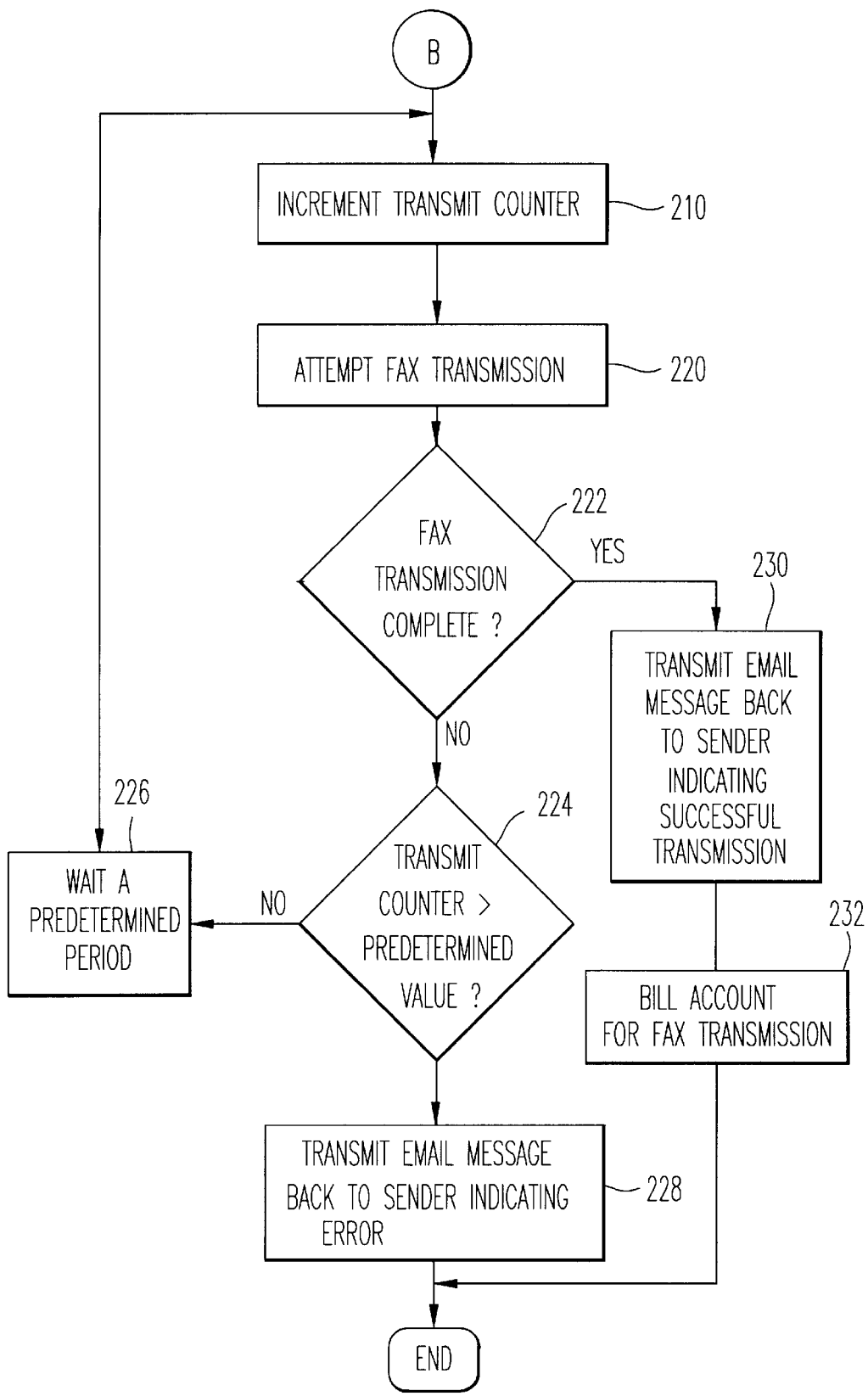

FIGS. 8A–8C illustrate the process performed by the transmission computer 26 (or another processing device such as the relay device 34) illustrated in FIG. 1. After starting, the email is received by the transmission computer 26 in step 170. Next, step 172 determines the sender of the email which has been received. This is simply performed by scanning the appropriate lines of the received email in order to determine who is the sender. In the exemplary email illustrated in FIG. 4, the sender is Jim@network.com. Step 174 then determines if the email sender has a valid account. This is determined by comparing the email address of the sender with a database containing valid accounts. If the email address from which the message has been sent does not correspond to a valid account, flow proceeds from step 174 to step 176 which transmits a message back to the sender that a valid count does not exist and the process of FIGS. 8A–8C ends. The preferred embodiment of the invention checks the email address in step 174 but alternative manners of checking to see whether the sender of a communication has a valid account can be performed in any desired manner. As an example, instead of checking the address from which the email originated, a name or an account code can be checked.

If step 174 determines that the person transmitting the email has a valid account, flow proceeds to step 178 where the valid stamps for the email are looked up in a database. These stamps were created and transmitted to the user as explained above with respect to steps 108 and 110 of FIG. 3. Step 180 then checks the email message to determine if it contains a valid stamp; that is a stamp or authorization code which matches a stamp or authorization code which was looked up in step 178. The text of the email message or the header, or any other part, or all parts of the email are analyzed to determine if there exists a valid stamp. If a valid stamp is not contained with the email communication, flow proceeds to step 182 which sends a message to the person transmitting the email that the email does not contain a valid stamp. From step 182, the process of FIGS. 8A–8C ends.

If step 180 determines that the email contains a valid stamp, flow proceeds to process A illustrated in FIG. 8B.

When flow proceeds to FIG. 8B, it has already been determined by FIG. 8A that the email originated from an authorized user and a valid stamp or authorization code has been used. It is possible for this stamp to be used a plurality of times or even possibly an infinite number of times. If the stamp can be used a plurality of times, a counter is needed to determine the number of times the stamp has been used. A counter is set to the number of times the stamp can be used and each time the stamp is used, the counter decreased by one. When the stamp counter is equal to zero, the stamp can be cancelled or indicated as no longer being valid. As an alternative, the stamp counter is set to zero and incremented each time it is used and when the stamp counter reaches the maximum number of times a stamp can be used, the stamp is then cancelled. By having each stamp being capable of being used a limited number of times such as 10 or 20 times, for example, if the stamp is stolen by an unauthorized user and the unauthorized user is able to forge the account information, an unauthorized user can use somebody else's account for only a limited number of times. As the stamp is only used as an authorization code which permits a certain account to be charged, stamps can be freely issued to the authorized user without charge since the stamp itself has no intrinsic value. The charge to the account occurs only after the stamp is used. Further, it is not necessary to include a stamp on each individual page of the communication being transmitted and the stamp only needs to appear once in the entire communication.

In FIG. 8B, step 190 reduces the counter for the stamp contained within the communication by one. Step 192 then determines if the stamp counter is equal to zero. If the stamp counter is equal to zero, flow proceeds to step 194 which cancels the stamp, deletes the stamp from the database, or in any manner indicates that the stamp is no longer usable with the account. Step 196 then deletes the stamp from the email. In the preferred embodiment, the stamp is placed on a separate line anywhere within the body of the text of the email and this line is simply deleted from the email. By deleting the stamp, the party receiving the email is not made aware of the particular stamp or authorization code which was utilized for the transmission of the facsimile. Step 198 then converts the email to a facsimile format. In the preferred embodiment, the lines of the email, if extending without a carriage return greater than a width of the facsimile page, are automatically wrapped to a next line. Next, the email is converted to a facsimile image in a conventional manner, for example. Many commercial products exist such as facsimile-modems and bundled software for computers for generating facsimiles from text within the computer.

A transmit counter is utilized to attempt to transmission of the facsimile a plurality of times, should the initial attempt to transmit the facsimile fail. In step 200, this transmit counter is set to zero and flow proceeds to process B illustrated in FIG. 8C. In FIG. 8C, step 210 increments the transmit counter by one and step 220 attempts to transmit the facsimile. If step 222 determines that the facsimile was transmitted correctly and has been completed, flow proceeds to step 230 which transmits an email message, such as the message illustrated in FIG. 7, back to the original sender indicating the successful transmission of a facsimile. Step 232 will then bill the account for the fax transmission, for example, based on the number of pages transmitted, and the location to which the facsimile was transmitted).

If step 222 determines that the facsimile was not successfully transmitted, flow proceeds to step 224 which determines whether the transmit counter is greater than a predetermined value. If it is not, a predetermined time period such as 5 or 10 minutes, for example, is waited in step 226 and flow proceeds back to step 210. If step 224 determines that the transmit counter is greater than the predetermined value, such as five, no further attempts are made to transmit the facsimile and an email is transmitted back to the originator of the original email message indicating that the facsimile was not successfully transmitted and the reason why the facsimile was not transmitted such as the telephone line was busy, the telephone was not answered, the telephone line was picked up without transmitting back the proper facsimile tones, indicating the line is probably a voice line, or an indication that the transmission of the fax was disconnected for some unknown reason, for example. From steps 228 and 232, the process of FIG. 8C ends.

As a security feature of the present invention, the stamps or authorization codes are preferably used only for a limited number of times, for example, between one and twenty times. However, as the stamps can only be used a limited number of times, it is necessary to periodically provide a user with new stamps. The flowchart of FIGS. 9A and 9B illustrate a process for issuing new stamps to a user.

By converting email messages to facsimiles only for email which originates from a valid address and contains a valid authorization code, almost all unauthorized attempts to charge an email to facsimile delivery to somebody else's account can be eliminated. First, the email message must originate from a pre-registered email address. However, it is possible for a computer hacker to make electronic email messages contain a false address which makes it appear as if the email originated from a valid user's account. As a second security precaution, the email message must also contain a valid authorization code or stamp which is only good for a limited number of uses. Therefore, the hacker must not only falsify the originating email address but must somehow steal the authorization codes which are transmitted to the user, all to send a facsimile which costs approximately $0.15–$0.50 per page. Therefore, while it may always be possible for someone to falsify an originating email address and to steal the authorization codes of an authorized user, the value of the service stolen by the user is quite low, hopefully not making it worth the effort to improperly charge a different user's account.

Additionally, even if an unauthorized person improperly gains access to an authorization code and has the capability to generate email which appears to originate from a valid registered email address, the confirmation that a facsimile was properly delivered will still be sent to the email address which was originally registered. Therefore, unless the return email confirming delivery is intercepted, the authorized user will immediately know that another is using his or her account. The previously issued authorization codes can then be canceled and new authorization codes issued to the authorized user through a secure communication medium such as via United States mail, facsimile, or a secure internet communication channel.

Figure 9A:
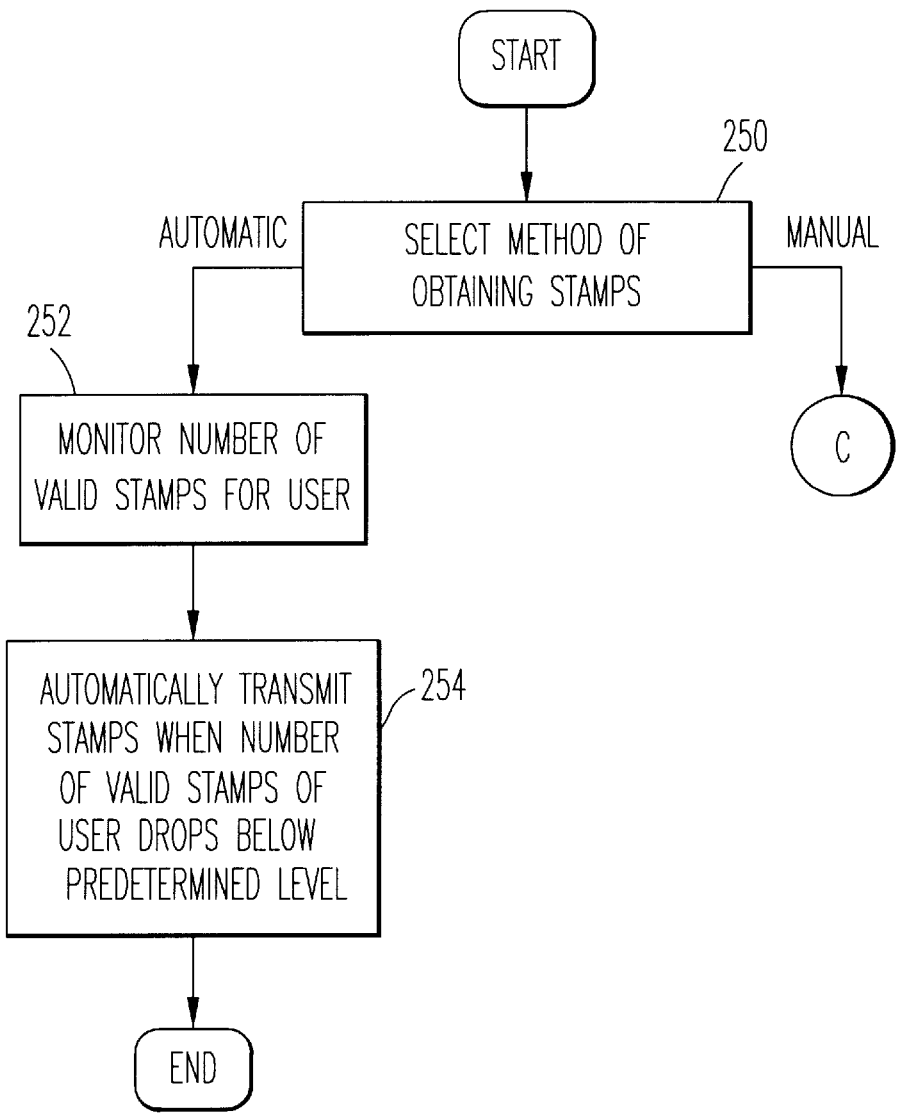
FIGS. 9A and 9B are a flowchart illustrating the process of obtaining stamps or authorization codes.
Figure 9B:
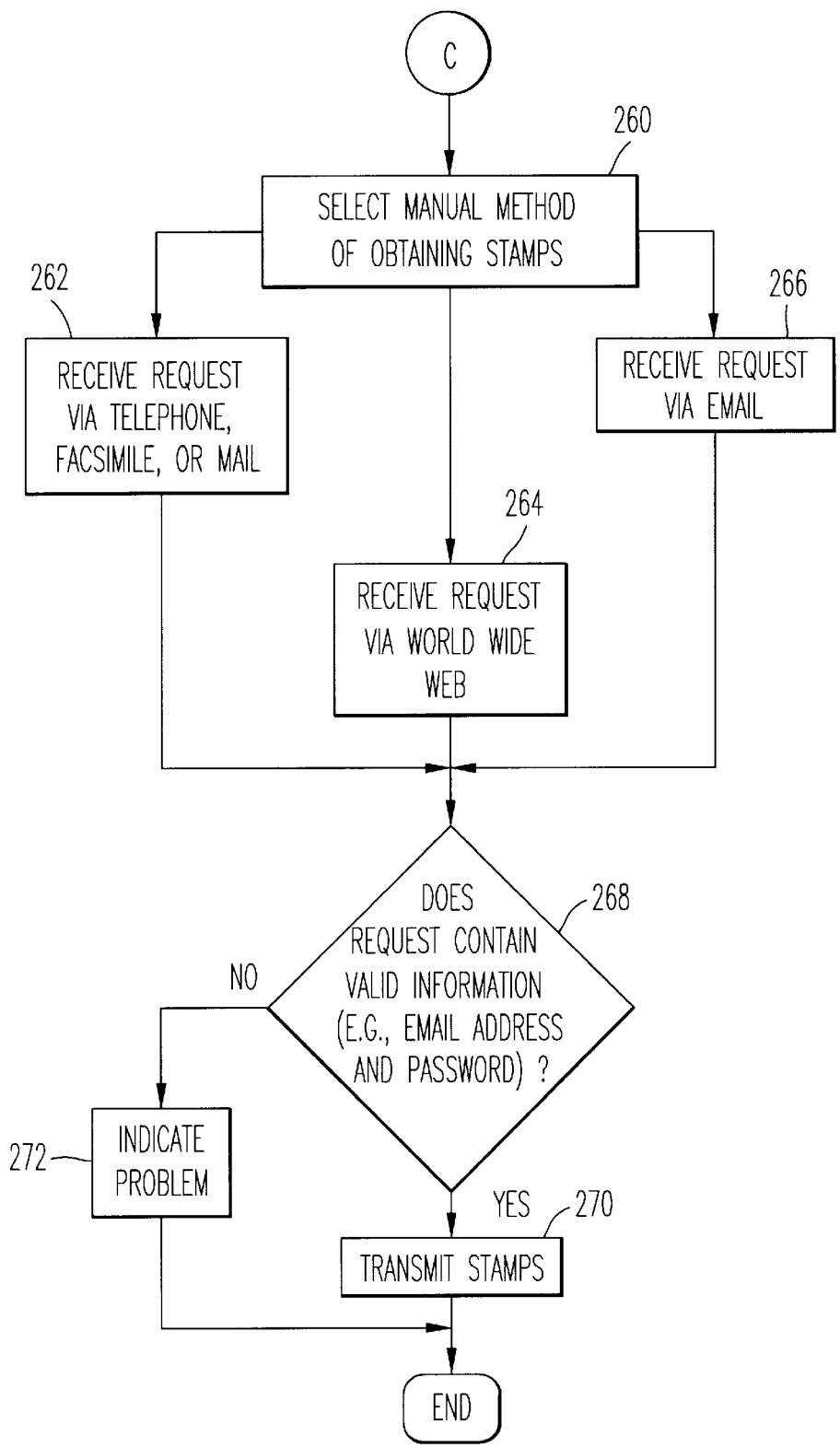

In FIG. 9A, step 250 selects a method for obtaining stamps. If the user desires automatic issuance of stamps, flow proceeds to step 252 which monitors the number of valid stamps which exist for a user. Step 254 automatically transmits one or more additional stamps to the user when the number of valid stamps possessed by a user falls below a predetermined threshold. For example, when a stamp has only one use left, the user will automatically be transmitted one or more new stamps which are generated in the manner explained in step 108 of FIG. 3. The stamps can be transmitted to the user in step 254 in any desired manner such as via email back to the email address which was previously registered for the account, via facsimile to a registered facsimile number of the user, via regular mail, or any other manner. After step 254 is performed, the process of FIGS. 9A and 9B ends.

If a user desires to manually request that stamps be issued, flow proceeds from step 250 to process C illustrated in FIG. 9B. In FIG. 9B, the user selects a manual method of obtaining stamps such as requesting stamps using a telephone, facsimile, or regular mail in step 262, requesting the stamps using the World Wide Web in step 264. If the World Wide Web is utilized in step 264, a secure browser may be used. The additional stamps may also be requested using regular email in step 266. In each of steps 262, 264, and 266, the password which was entered in step 102 of FIG. 3 during the registration process is entered. Step 266 is the least preferable manner of requesting the stamps as a user's account information including password might be intercepted during the email transmission and the password along with the name of the account such as the originating email address could allow an unauthorized user to have extensive use of another person's account.

After the requests are received using steps 262, 264 or 266, step 268 determines if the request contains the necessary information such as the password and the email address of a valid account. If the request contains the proper information, the stamps are transmitted in step 270 using any desired method such as email, other forms of internet communication, facsimile, or regular mail. If step 268 determines that the request does not contain the necessary information or the information is not valid, flow proceeds to step 272 which provides the requestor with an indication that a valid request has not been received. From steps 272 or 270, the process of FIG. 9B ends.

While internet email is not considered to be a secure form of transmission, it is possible for the sender of the original email to encrypt the email using any desired process, such as the known and conventional PGP encryption method or by using any desired form of encryption such as the SMIME standard, when this new form of email encryption becomes available. In order to utilize this encryption scheme, it will be necessary for the transmission computer 26 to be able to decrypt the encrypted message generated by the local computer 30. It will not be necessary to transmit the facsimile in encrypted form because conventional telephone lines are considered secure enough for most facsimile transmission purposes.

As an alternative to transmitting the email address to a particular phone number, names or name lists may be set up within the transmission computer 26. For example, the user could register a list containing a plurality of facsimile numbers within the transmission computer 26 and a single email message sent indicating that each number of a pre-registered group is to receive the facsimile.

The email to facsimile system has been described using a simple text email message. However, the invention can also be applicable to email messages containing attached files, if desired. The attached file can contain a graphics or word processing file which is converted to the proper final format by the transmission computer 26 before being sent by facsimile.

The above described system contains numerous advantages. A user can use the email software with which he is already familiar, there is no need to dial and redial long numbers on a fax keypad, and there is no need to feed or refeed misfed pages into a facsimile scanner. The system also provides the convenience of email with the advantages of a facsimile. This allows messages to be sent without leaving your computer, allows email messages to be transmitted to people who do not have email, allows a fax list to be maintained in an existing email address book, eliminates worrying whether somebody is regularly checking his or her email as messages go directly to the desired facsimile machine, there is no need to worry whether a recipient's computer is working and receiving email, and there is no waiting for a recipient facsimile machine to be free or refilled with paper as the present invention automatically performs the waiting and retransmission, as necessary. The invention is reliable in that the system illustrated in FIG. 1 can be used to deliver facsimile machines to all facsimile machines located worldwide, provides the senders email account a notification of successful (or unsuccessful) facsimile delivery, and the stamp authentication assures that only appropriate and authorized people use an account.

The present invention has been described above in detail with respect to the delivery of an email message using a facsimile. However, the use of a stamp or authentication code along with an identifier of an account can be applied to any desired situation. For example, in place of an email or facsimile transmission system, the invention might be used by a voice-mail system which is maintained by a third party. For example, a user can telephone using either conventional telephone lines, or an internet connection, a central voice message center and leave a voice-mail message for a user. The person transmitting would indicate an account code and a stamp or other authentication code. The voice-mail system can then forward the voice-mail or allow another party to call in and retrieve the voice-mail, for example using a toll free phone number.

While the preferred embodiment of the invention translates an email to a facsimile, other email or communication related services can utilize the billing aspect or stamp feature of the invention. For example, the invention can be used to bill for translation services. When a document is to be translated from one language to another, a stamp can be included when the document is emailed to the translation service in order to indicate that the document to be translated is from an authorized user and to assure that an account is properly billed. After the document is translated, the document can be emailed, faxed, sent via United States mail, sent via express or overnight mail to the desired recipient. Similarly, the invention may be used to bill for document format conversion, for example by a service converting a document from one word processor format to another word processor format. The invention is also applicable to an anonymous re-mailing service which receives a message and then forwards that message to another so that the original source of the message cannot be determined. Further, instead of converting an email to a facsimile as is done in the preferred embodiment, the email can be converted to United States mail, an overnight or express letter which uses a private carrier such as Federal Express, or a voice-mail message.

The facsimile which is transmitted by the transmission computer 26 is considered to be a transmitted object. However, the object which is transmitted may be any type of communication and may also be any other type of object such as a product, money, or service related object.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by: letters patent of the United States is:

1. A method for transmitting, comprising the steps of:

registering a user by inputting an identifier of the user and inputting billing information of the user to create registration information;

transmitting to the user an authorization code which is only valid for a predetermined number of communications;

creating a communication by the user which includes a message and the authorization code;

transmitting the communication from a first location to a second location;

receiving the communication at the second location;

determining if the communication which has been received is from an authorized user;

determining if the communication which has been received contains a valid authorization code;

transmitting an object from the second location to a third location, when the communication is determined to be from an authorized user and the communication is determined to contain a valid authorization code; and providing a new authorization code which is only valid for a predetermined number of communications using said registration information.

2. A method according to claim 1, wherein:

the registering step includes inputting and registering an electronic mail address of the user which is the identifier of the user;

the step of creating the communication creates an electronic mail message which includes the electronic mail address of the user; and the step of determining if the communication is from an authorized user determines if the communication contains an electronic mail address which corresponds to the electronic mail message of the user which has been registered.

3. A method according to claim 2, further comprising the step of:

converting the electronic mail message to a facsimile message, wherein:
   the step of transmitting the object includes transmitting the facsimile message.

4. A method according to claim 3, further comprising the step of:
   removing the authorization code from the communication,
   wherein:
      the step of transmitting the facsimile message includes transmitting the facsimile message without the authorization code.

5. A method according to claim 4, further comprising the step of:
   transmitting a confirmation message as an electronic mail message to the first location indicating that the facsimile message was successfully transmitted, after the step of transmitting the facsimile message.

6. A method according to claim 1, further comprising the step of:
   generating the authorization code using a random number generator.

7. A method according to claim 1, further comprising the step of:
   counting a number of times the authorization code is used; and
   indicating the authorization code is no longer valid, after the authorization code is used a predetermined number of times.

8. A method according to claim 1, wherein the step of providing a new authorization code is performed when a number of remaining uses of said authorization reaches a predetermined number.

9. A method according to claim 1, wherein the step of creating a communication creates a single communication which is transmitted with the authorization code.

10. A method according to claim 1, wherein the step of transmitting the object comprises:
    transmitting the object which is said message contained in the communication transmitted from the first location to the second location, said message being a text message.

11. A method according to claim 1, further comprising the step of:
    charging the user for transmitting the object from the second location to the third location.

12. A system for transmitting, comprising:
    means for registering a user by inputting an identifier of the user and inputting billing information of the user to create registration information;
    means for transmitting to the user an authorization code which is only valid for a predetermined number of communications;
    means for creating a communication by the user which includes a message and the authorization code;
    means for transmitting the communication from a first location to a second location;
    means for receiving the communication at the second location;
    means for determining if the communication which has been received is from an authorized user;
    means for determining if the communication which has been received contains a valid authorization code; and
    means for transmitting an object from the second location to a third location, when the communication is determined to be from an authorized user and the communication is determined to contain a valid authorization code; and
    means for providing a new authorization code which is only valid for a predetermined number of communications using said registration information.

13. A system according to claim 12, wherein:
    the means for registering includes means for inputting and registering an electronic mail address of the user which is the identifier of the user;
    the means for creating the communication creates an electronic mail message which includes the electronic mail address of the user; and
    the means for determining if the communication is from an authorized user determines if the communication contains an electronic mail address which corresponds to the electronic mail message of the user which has been registered.

14. A system according to claim 13, further comprising:
    means for converting the electronic mail message to a facsimile message,
    wherein:
       the means for transmitting the object includes means for transmitting the facsimile message.

15. A system according to claim 14, further comprising:
    means for removing the authorization code from the communication,
    wherein:
       the means for transmitting the facsimile message includes means for transmitting the facsimile message without the authorization code.

16. A system according to claim 15, further comprising:
    means for transmitting a confirmation message as an electronic mail message to the first location indicating that the facsimile message was successfully transmitted, after the facsimile message is transmitted.

17. A system according to claim 12, further comprising:
    means for generating the authorization code using a random number generator.

18. A system according to claim 12, further comprising:
    means for counting a number of times the authorization code is used; and
    means for indicating the authorization code is no longer valid, after the authorization code is used a predetermined number of times.

19. A system according to claim 12, wherein the means for providing a new authorization code operates when a number of remaining uses of said authorization reaches a predetermined number.

20. A system according to claim 12, wherein the means for creating a communication creates a single communication which is transmitted with the authorization code.

21. A system according to claim 12, wherein the means for transmitting the object comprises:
    means for transmitting the object which is said message contained in the communication transmitted from the first location to the second location, said message being a text message.

22. A system according to claim 12, further comprising:
    means for charging the user for transmitting the object from the second location to the third location.

23. A method for converting an electronic mail message to a facsimile message, comprising the steps of:
    registering a user by inputting an identifier of the user which is an electronic mail address of the user, and inputting billing information of the user;

transmitting to the user an authorization code which is only valid for a predetermined number of uses, after the step of registering;

creating an electronic mail message by the user which includes the authorization code, the identifier of the user which is the electronic mail address of the user, and a telephone number of a facsimile machine;

transmitting the electronic mail message as a communication from a first location to a second location;

receiving the communication at the second location;

determining if the communication which has been received is from an authorized user by determining if the electronic mail message originated from the electronic mail address of the user which has been registered;

determining if the communication which has been received contains a valid authorization code; and converting the electronic mail message to a facsimile message without the authorization code; and transmitting the facsimile message from the second location to the telephone number of a facsimile machine which is at a third location.

24. A method according to claim 23, wherein:

the step of creating the electronic mail message addresses the message in an internet electronic mail format which begins with the telephone number, followed by the @ symbol, and followed by further address information.

25. A method for transmitting, comprising the steps of:

creating a communication by the user which includes a message and an authorization code therein;

transmitting the communication from a first location to a second location;

receiving the communication at the second location;

determining if the communication which has been received contains a valid authorization code; and transmitting an object from the second location to a third location, when the communication is determined to contain a valid authorization code.

26. A method according to claim 25, further comprising the step of:

determining if the communication which has been received at the second location is from an authorized user, wherein the transmitting step transmits the object from the second location to the third location when the communication is determine to contain a valid authorization code and the communication is determined to be from an authorized user.

27. A method according to claim 25, wherein:

the step of transmitting the communication from the first location to the second location comprises transmitting the communication to include a text message as said message along with the authorization code; and the step of transmitting the object comprises transmitting contents of said text message from the second location to the third location.

28. A method according to claim 25, wherein:

the step of transmitting the object comprises transmitting the object by facsimile.

29. A method according to claim 25, further comprising the step of:

charging the user for transmitting the object from the second location to the third location.

30. A method according to claim 25, wherein the step of creating the communication comprises:

creating the communication by the user which includes the authorization code which is only valid for a predetermined number of communications.

* * * * *